United States Patent [19]
Fenton et al.

[11] Patent Number: 6,035,017
[45] Date of Patent: *Mar. 7, 2000

[54] BACKGROUND SPEECH RECOGNITION FOR VOICE MESSAGING APPLICATIONS

[75] Inventors: Francis Michael Fenton, Middletown; Randolph John Pilc, Thomas River; Lawrence Richard Rabiner, Berkley Heights, all of N.J.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/788,752

[22] Filed: Jan. 24, 1997

[51] Int. Cl.⁷ ...................................................... H04M 1/64
[52] U.S. Cl. ...................................... 379/88.04; 379/88.14
[58] Field of Search ..................................... 704/251, 270, 704/275; 379/67, 88, 89, 142, 355, 201, 211, 88.01, 88.04, 88.13, 88.14, 88.15

[56] References Cited

U.S. PATENT DOCUMENTS

| | | |
|---|---|---|
| 4,837,798 | 6/1989 | Cohen et al. |
| 5,033,088 | 7/1991 | Shipman ..................................... 379/88 |
| 5,231,670 | 7/1993 | Goldhor et al. .......................... 381/43 |
| 5,329,578 | 7/1994 | Brennan et al. .......................... 379/67 |
| 5,347,574 | 9/1994 | Morganstein ............................ 379/210 |
| 5,396,542 | 3/1995 | Alger et al. .............................. 379/265 |
| 5,504,805 | 4/1996 | Lee ............................................. 379/67 |
| 5,625,748 | 4/1997 | McDonough et al. .................. 704/251 |
| 5,644,625 | 7/1997 | Solot ......................................... 379/88 |
| 5,651,056 | 7/1997 | Eting et al. ............................... 379/88 |
| 5,712,901 | 1/1998 | Meermans. |

OTHER PUBLICATIONS

Rose et al., "Techniques for information Retrieval from Voice Messages"; IEEE ICASSP, vol. I pp. 317–320, 1991.

Jones, G.J.F. et al., "Video mail retrieval: the effect of word spotting accuracy on precision.", 1995 International Conference on Acoustics, Speech, and Signal Processing Conference Proceedings, IEEE, p. 309–12 vol. 1 of 5.

*Primary Examiner*—Daniel S. Hunter

[57] ABSTRACT

Recorded telephone messages may be automatically handled as specified by the called party by means of a background speech recognition server for a telephone network, a private branch exchange, or a personal computer telephone manager. The called party initializes the method by storing multiple action records in a computer, each containing a key word and an action description. Incoming telephone messages can then be automatically processed by subjecting the audio record of each message to a speech recognition program to produce a text record. The computer then compares the text record with the key words in the action records. When a match is found, the action specified in the action record bearing the matching key words, is performed. In this manner, recorded telephone messages may be automatically handled and prioritized as specified by the called party.

7 Claims, 8 Drawing Sheets

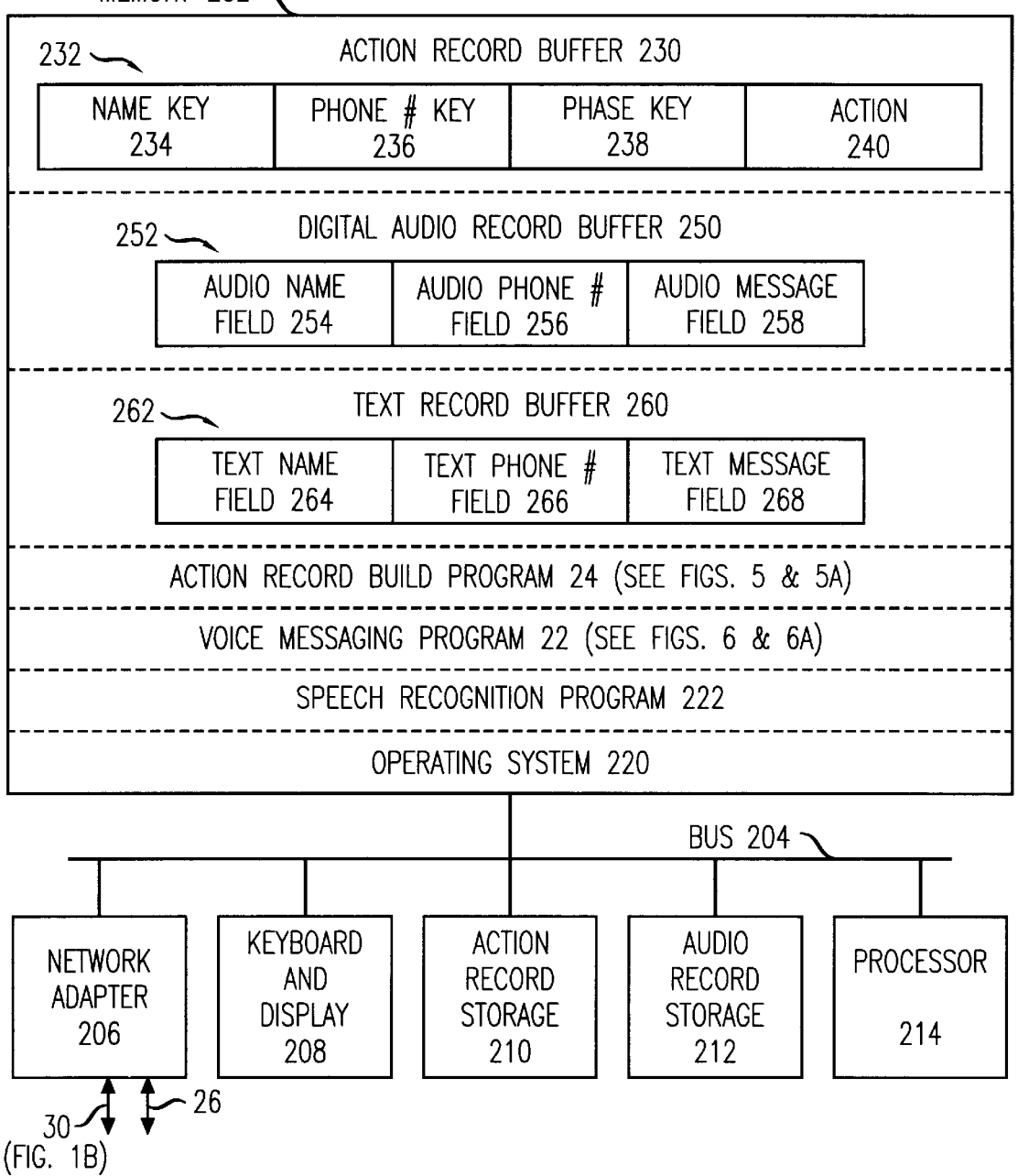

ACTION RECORD 232

| NAME KEY 234 | PHONE # KEY 236 | PHASE KEY 238 | ACTION 240 |

DIGITAL AUDIO RECORD 252

| AUDIO NAME FIELD 254 | AUDIO PHONE # FIELD 256 | AUDIO MESSAGE FIELD 258 |

TEXT RECORD 262

| TEXT NAME FIELD 264 | TEXT PHONE # FIELD 266 | TEXT MESSAGE FIELD 268 |

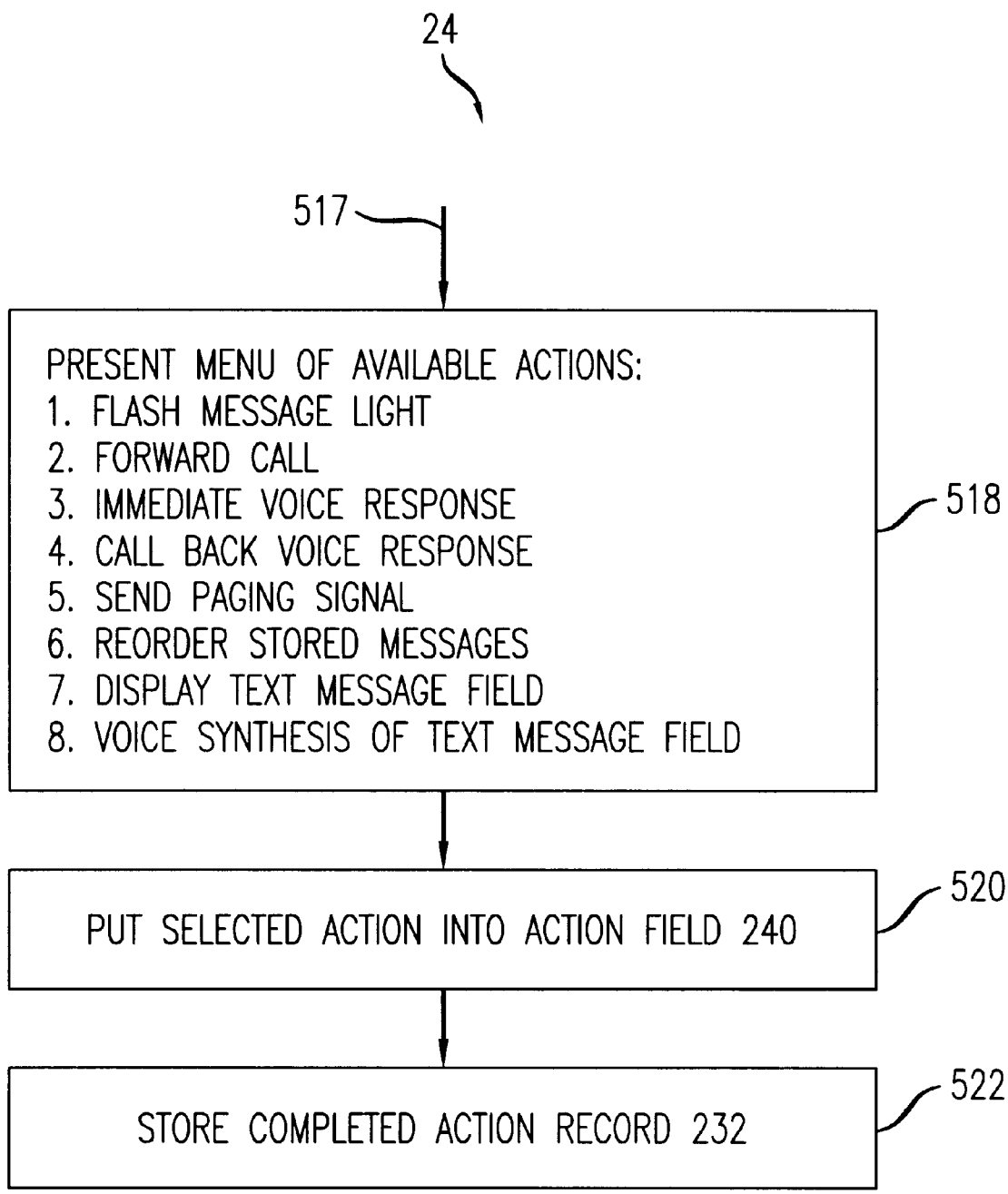

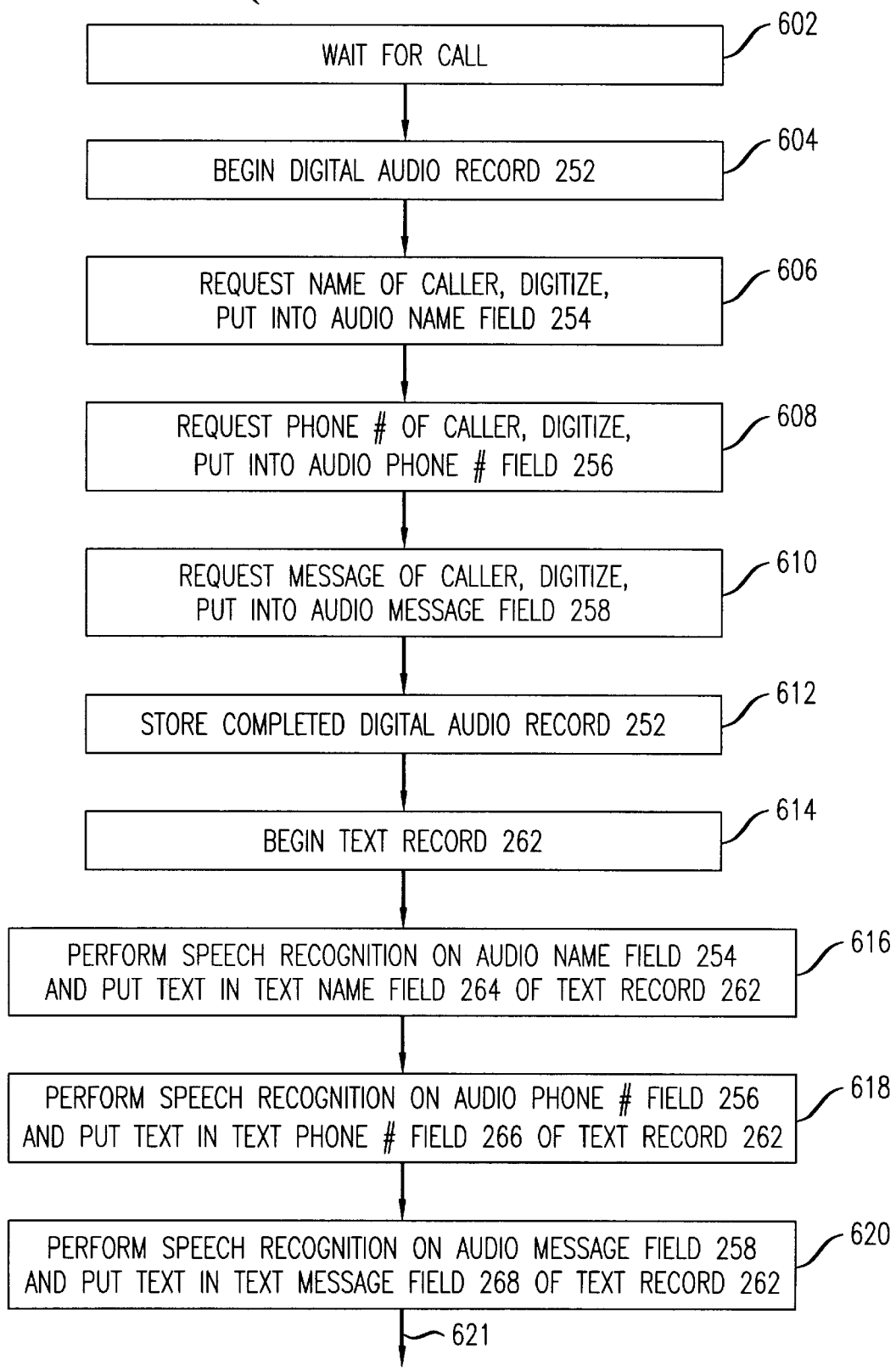

BACKGROUND SPEECH RECOGNITION FOR VOICE MESSAGING APPLICATIONS

BACKGROUND OF THE INVENTION

1. Field of the Invention

The invention disclosed broadly relates to communication systems and more particularly relates to a system and method for speech recognition in voice messaging applications.

2. Description of the Related Art

The automatic recording of telephone voice messages is a convenience to both the caller and to the called party. The caller may conveniently call a business office telephone during non-business hours and record a message that may be played back by the called party during the following business day. One problem with this convenience is the accumulation of unsolicited sales calls. The called party must listen through the duration of such calls before clearing them from the accumulated recorded messages. Similarly, the hearing of important recorded telephone messages must oftentimes be delayed while the called party plays back previously recorded calls of lesser importance.

SUMMARY OF THE INVENTION

Recorded telephone messages may be automatically handled as specified by the called party by means of the background speech recognition invention disclosed herein. A computer method is provided in a server for a telephone network, a private branch exchange, or a personal computer telephone manager, to automatically manage voice messages from callers. The called party initializes the method by storing multiple action records in the computer, each containing a key word and an action description. Key words include caller names, caller telephone numbers, and phrases that are considered by the called party to be significant. The called party wishes that messages that include such key words or phrases be handled by actions that the called party specifies, such as call forwarding, pre-recorded voice response, paging, reordering or prioritizing the sequence of message playback, and the like.

Incoming telephone messages can then be automatically processed as follows. The computer receives at least a portion of a voice message from a caller. The caller's name, telephone number, and message are recorded in an audio record. Then each of the portions of the audio record is subjected to a speech recognition program to produce a text record. The computer then compares the various portions of the text record with the corresponding key words in the previously prepared action records. The name of the caller is compared with name keys in the action records. If a match is found, but the quality of the match is suspect, the phone number of the caller is compared with the phone number key in the same action record. The phrases in the message of the caller are compared with phrase keys in the action records. When a match is found, the action specified in the action record bearing the matching key words, is performed. In this manner, recorded telephone messages may be automatically handled and prioritized as specified by the called party.

DESCRIPTION OF THE FIGURES

FIG. 2 is a functional block diagram of the voice message action processor 20.

FIG. 5 and FIG. 5A is a flow diagram of the sequence of operational steps in the action record build program 24.

FIG. 6 and FIG. 6A is a functional block diagram of the sequence of operational steps in the voice massaging program 22.

DISCUSSION OF THE PREFERRED EMBODIMENT

Figure 1:
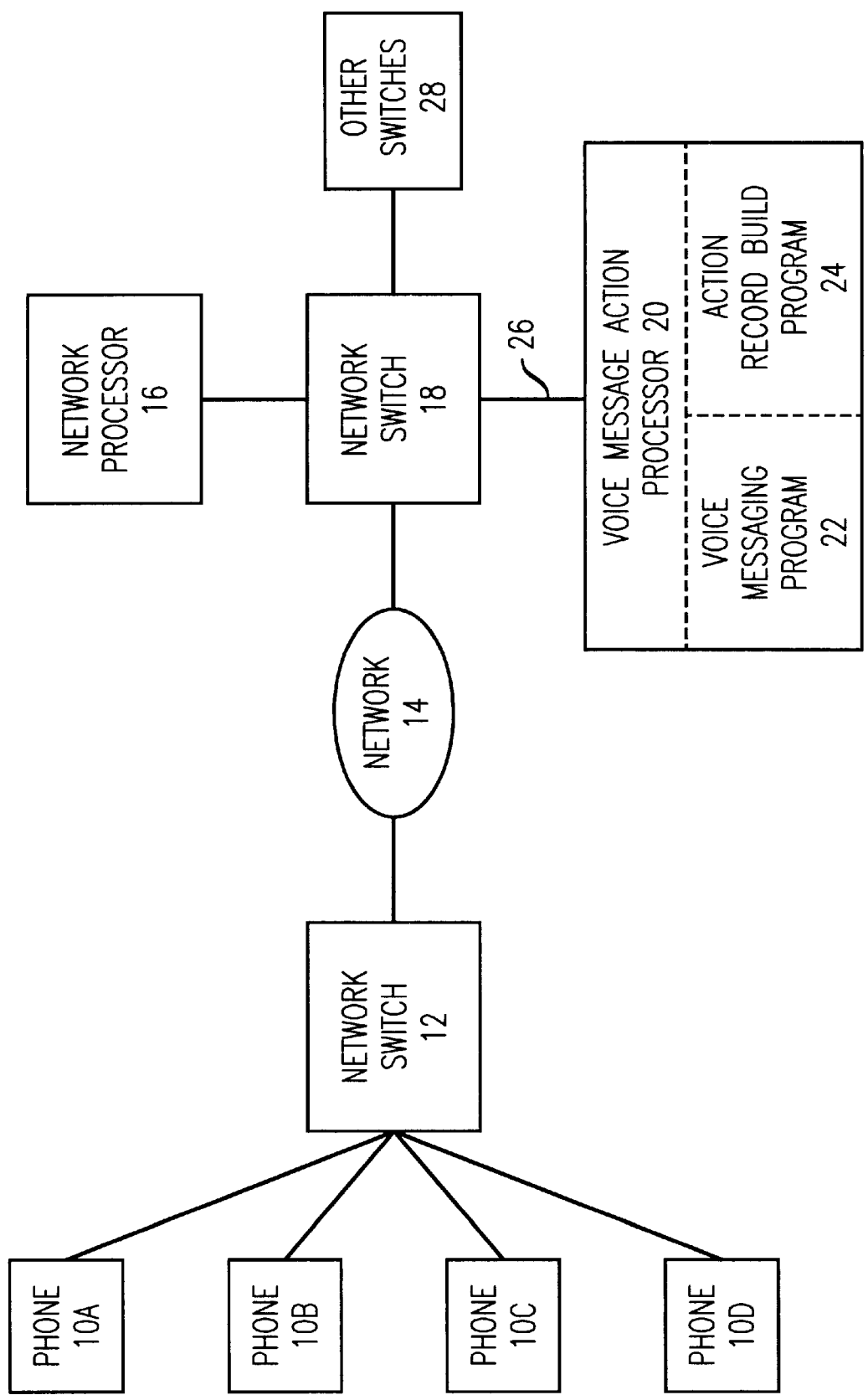
FIG. 1 is a network diagram showing the invention as used in a telephone network.

FIG. 1 shows a telephone network within which the invention can be applied. Telephones 10A, 10B, 10C and 10D are connected to a network switch 12 which is connected through the network 14 to the network switch 18. The network switch 18 can be connected to other switches 28 in the network. The network switch 18 is controlled by network processor 16 and is connected by line 26 to the voice message action processor 20 which embodies the invention. The voice message action processor 20 includes the voice messaging program 22, and the action record build program 24. Background speech recognition can be achieved for voice messaging applications by means of the voice message action processor 20, in conjunction with the voice messaging program 22 and the action record build program 24. In operation, the action record build program 24 enables a subscriber at a telephone 10A, for example, to store keywords such as the names or telephone numbers of persons whose messages are of particular importance to the subscriber. Associated with each keyword is an action mode assigned by the subscriber, such as the launching of a paging signal to the subscriber or the reordering or prioritizing of the messages received from other callers. An action is executed in response to the detection of a message containing the corresponding keyword. After the interval for setting up keywords and associated action modes using the action record build program 24, the subscriber invokes the voice messaging program 22 to begin monitoring messages received from the telephone network 14. The voice messaging program 22 receives and records analog audio messages, digitizing those messages for storage. The voice messaging program 22 then performs wordspotting against the stored set of keywords in an attempt to identify the presence of a keyword in any audio message. If a keyword is spotted, the voice messaging program 22 then takes the predetermined action which has been specified by the subscriber. In this manner, voice messages received by the subscriber are more effectively managed and more immediately so that important messages have an appropriate disposition automatically made.

Figure 1A:
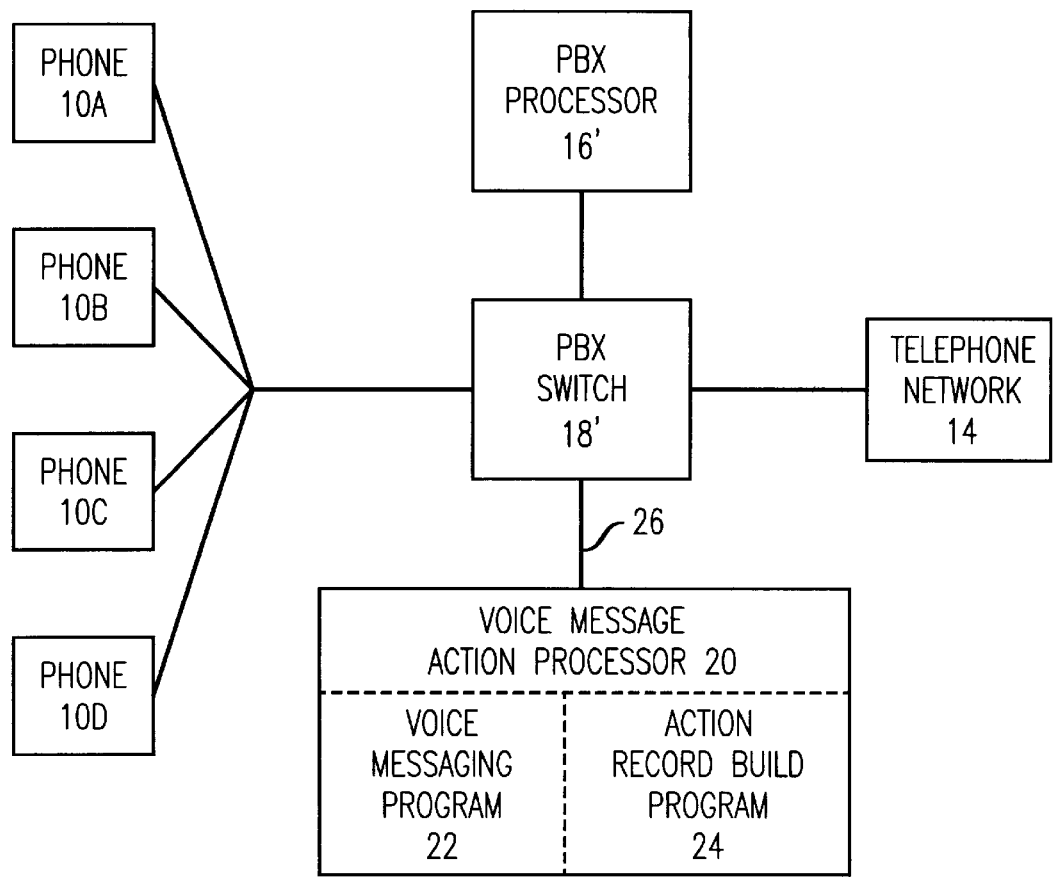
FIG. 1A is a network diagram showing the invention as used in a private branch exchange (PBX) network.

FIG. 1A illustrates another application of the invention, wherein the voice message action processor 20 is connected by means of line 26 to a private branch exchange (PBX)

switch 18'. The PBX processor 16' controls the PBX switch 18', which is connected to the telephones 10A–10D and is also connected to the telephone network 14.

Figure 1B:
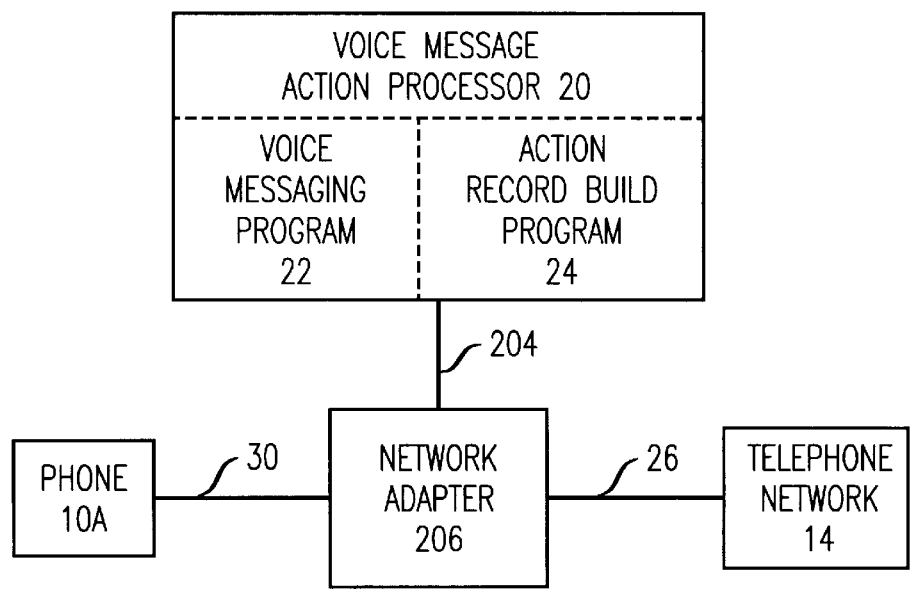
FIG. 1B is a system block diagram showing the invention used in a personal computer.

FIG. 1B illustrates another application of the invention wherein the voice message action processor 20 is embodied as a personal computer which is connected by means of bus 204 to the network adapter 206 which in turn is connected to the telephone 10A by means of line 30 and is connected to the telephone network 14 by means of the line 26.

Figure 3:
FIG. 3 is a format diagram of the action record 232.
Figure 4A:
FIG. 4A is a format diagram of the digital audio record 252.
Figure 4B:
FIG. 4B is a format diagram of the text record 262.

Turning now to FIG. 2, a functional block diagram is shown of the voice message action processor 20. The voice message processor 20 includes the memory 202 which is connected by means of the bus 204 to the network adapter 206, the keyboard and display 208, the action record storage 210, the audio record storage 212, and the processor 214. The network adapter 206 is connected by means of line 26 to the telephone network 14, as is shown in FIGS. 1, 1A, and 1B. In the personal computer application of FIG. 1B, line 30 shown in FIG. 2 connects the network adapter 206 to the telephone 10A. The memory 202 includes the operating system 220, the speech recognition program 222, the voice messaging program 22, the action record build program 24, the action record buffer 230, the digital audio record buffer 250, and the text record buffer 260. The voice messaging program 22 can be seen in greater detail in the flow diagrams of FIGS. 6 and 6A. The action record build program 24 is shown in greater detail in the flow diagrams of FIGS. 5 and 5A. The action record buffer 230 stores the action record 232. The action record 232 includes the name key 234, the phone number key 236, the phrase key 238, and the action 240 for a particular action record 232. The digital audio record buffer 250 contains the digital audio record 252 which includes the audio name field 254, the audio phone number field 256, and the audio message field 258. The text record buffer 260 includes the text record 262, which includes the text name field 264, the text phone number field 266, and the text message field 268. The programs stored in the memory 202 are sequences of executable instructions which, when executed by the processor 214, carry out the operations of the voice message action processor 20. FIG. 3 shows a format diagram of the action record 232 with its respective fields. The name key 234, the phone number key 236, the phrase key 238, and action 240 are the fields of the action record 232. FIG. 4A shows a format diagram of the digital record 252 which includes the audio name field 254, the audio phone number field 256, and the audio message 258. FIG. 4B illustrates a format of the text record 262, which includes the text name field 264, the text phone number field 266, and the text message field 268.

Figure 5:
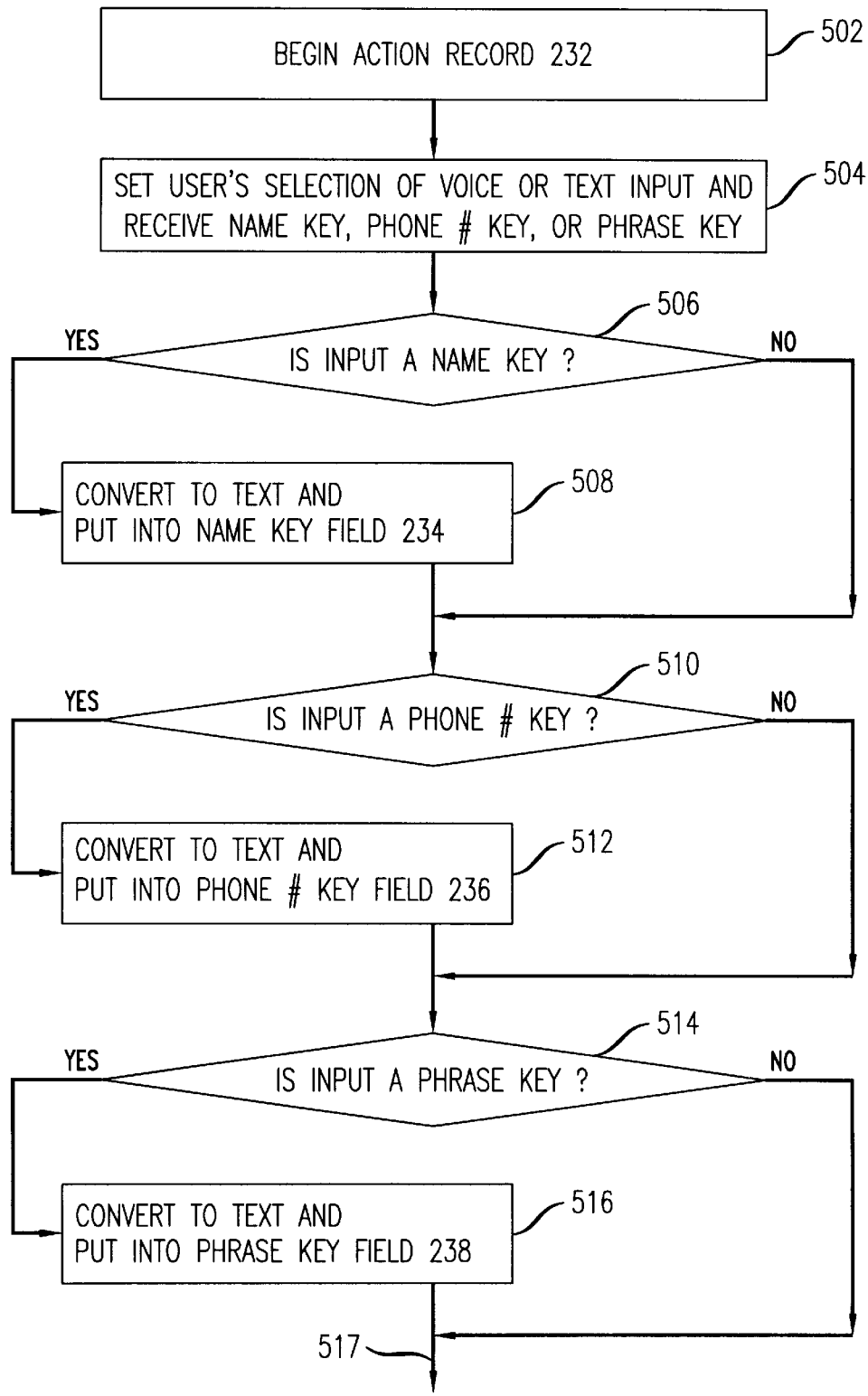

FIG. 5 and FIG. 5A is flow diagram of the action record build program 24, in accordance with the invention. The program 24 begins with step 502 which begins an action record 232 whenever an incoming message appears. Then step 504 sets the user's selection to either voice or text input. Step 504 then receives the name key, phone number key, or phrase key. For example, voice input can be by means of the user using the telephone 10A to speak the respective name key, phone number key, or phrase key, which is converted by the speech recognition program 222 into a corresponding character string of ASCII characters. The character string for the name key 234, the phone number key 236, or the phrase key 238, would be the text format stored in the action record 232. Step 506 of FIG. 5 determines whether the user has input a name key. If yes, then step 508 converts the spoken word for the name key into a text string and puts the text string into the name key field 234. Alternately, if the user has typed in the name key on the keyboard 208, for example, then the text string is directly put into the name key field 234. Step 510 of FIG. 5 then determines if the user has input a phone number key. If yes, then step 512 converts the spoken word for the phone number key into text and puts the text for the phone number key into the field 236. Once again, if the user has elected to type in the phone number on the keyboard 208, for example, the text string is directly put into the phone number key field 236. The flow diagram of FIG. 5 then passes to step 514 which determines if the user has input a phrase key. A phrase is any word or sequence of words which the user believes is significant and desires to have flagged for the invocation of a particular action. If step 514 results in a yes, then step 516 converts the spoken phrase into text and puts the text string into the phrase key field 238. Once again, if the user elects to type in the text on the keyboard 208, the text is directly input to the phrase key field 238. The flow diagram of FIG. 5 then passes over path 517 to FIG. 5A. In FIG. 5A, the action record build program 24 passes to step 518 which presents a menu of available actions to the user by means of the display 208. The menu can include typical actions such as actions numbered 1–8 in step 518. The example actions include action 1: flash a message light, action 2: forward a call, action 3: an immediate voice response, action 4: a call back voice response, action 5: send a paging signal, action 6: reorder the stored messages that are presently stored in the audio record storage 212, action 7: display the text message field 268 on the display 208, and action 8: produce a voice synthesis of the text message field 268 on a voice synthesizer (not shown) connected to the bus 204 in FIG. 2. Once the user has selected one of the actions in step 518, then step 520 puts the selected action into the action field 240 of the action record 232. The program then passes to step 522 which stores the completed action record 232 in the action record storage 210 of the voice message action processor of FIG. 2.

Figure 6A:
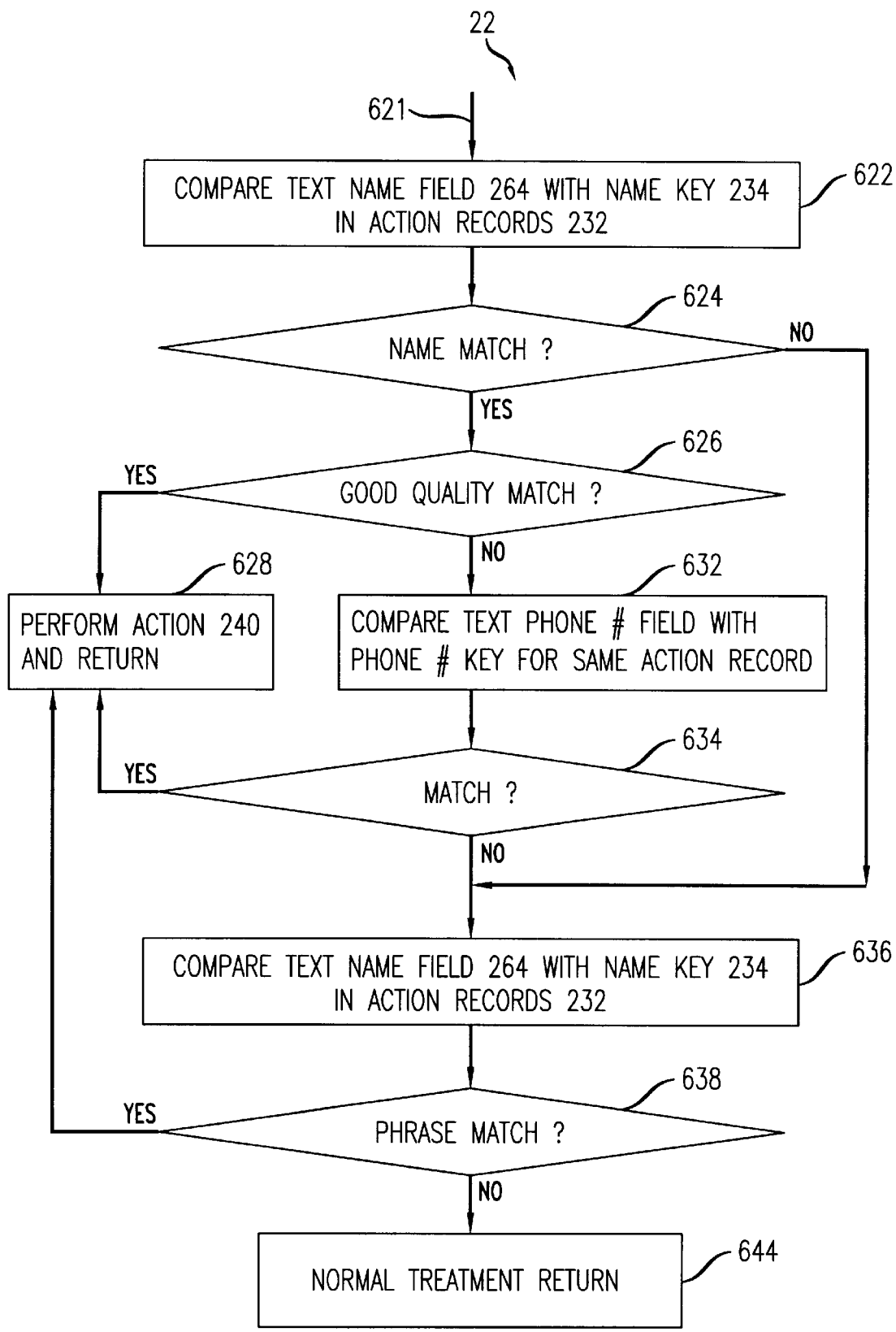

FIG. 6 and 6A show the flow diagram for the sequence of operational steps in the voice messaging program 22. Program FIG. 6 begins at step 602 which waits for an incoming call to the subscriber. Step 604 begins the digital audio record 252. Step 606 provides a voice response to make a request for the name of the caller. The caller's spoken name is sampled and digitized using pulse code modulation, for example, and a digital form put into the audio name field 254 of the digital audio record 252. Then step 608 provides a voice response request to the caller to state the caller's telephone number and this spoken sequence of numbers is digitized and put into the audio phone number field 256. Then step 610 provides a voice request to the caller to state the caller's message and then that spoken series of words is digitized and put into the audio message field 258. Step 612 then stores the completed digital audio record 252 in the audio record storage 212.

The voice messaging program 22 can now begin analyzing the digital audio record 252 and begin the text record 262 in step 614. Then in step 616, the program performs speech recognition using the speech recognition program 222, on the audio name field 254 and puts the resultant text in the text name field 254 of the text record 262. Then step 618 performs speech recognition on the audio phone number field 256 and puts the resultant text in the text phone number field 266 of the text record 262. Then in FIG. 6, step 620 performs speech recognition on the audio message field 258 and puts the resultant text in the text message field 268 of the text record 262. Then the flow diagram 22 of FIG. 6 passes over the path 621 to FIG. 6A. In FIG. 6A, the voice messaging program 22 continues with step 622 which compares the text name field 224 with the name key 234 in the action records 232 accessed consecutively from the action record storage 210 of FIG. 2. Then step 624 determines if there is a name match. If the answer is yes, then step 626 determines if the match is a good quality match. If it is, then step 628 performs the action specified in the action field 240 of the action record 232 corresponding to the name match for the name key 234. The program then returns to wait for another call at step 602. Alternately, if step 624 does not have a name match, then the program passes to step 636. Also alternately, if step 626 determines that there is not a good quality match for the name which satisfied the match 624 then step 626 passes to step 632. Step 632 compares the text phone number field 266 with the phone number key 236 for the same action record 232 with which the name key 234 successfully made a match in step 624. Then step 634 determines if the match in step 632 is successful, and if so then the program passes to step 628 which performs the action 240. Alternately, if step 634 determines that the text phone number field 266 does not match the phone number key 236 for the same action record, then the program passes to step 636. Step 636 compares the text message field 268 with the phrase key 238 in the action records 232 which are accessed from the action record storage 210. Step 638 determines if there is a phrase match. If there is a phrase match, then the program flows to step 628 which performs the action 240. However, if there is no phrase match in step 638, then the program flows to step 644 for normal treatment of the incoming call message. Step 644 returns the program to the step 602 to await the next call. In this manner voice messages are automatically handled so that the desired actions are performed.

Although a specific embodiment of the invention has been disclosed, it will be understood by those having skill in the art that changes can be made to that specific embodiment without departing from the spirit and the scope of the invention.

What is claimed is:

1. A method for managing voice messages for use on a voice messaging system, the method comprising the steps of:
   receiving from a user of the voice messaging system a spoken phrase;
   creating an association between the spoken phrase and an action description, which is selected by the user; and
   subsequently processing a voice message as a function of the created association by
   (1) searching for a match between portions of the voice message and the spoken phrase, and
   (2) if a match is found, performing the action, a priori associated with the action description, on the voice message.

2. The method of claim 1, wherein the creating step includes the steps of creating an action record comprising a name key field for representing name information of a calling party, a phone key field for representing information about a calling party number, a phrase key field for storing text representing the spoken phrase, and the action description.

3. The method of claim 1 wherein the searching step also searches for matches in the name key field and the call party number field for performing the associated action.

4. A method for managing voice messages for use on a voice messaging system, which provides a voice messaging service to a number of users, the method comprising the steps of:
   enabling each user to edit their own action records in the voice messaging system, each action record comprising a representation of a spoken phrase, provided by the user, and an action description, selected by the user, such that each user can define their own association between a representation of a spoken phrase and an action description independent of other user's defined action records;
   subsequently processing received voice messages for the users as a function of their respective action records by:
   (1) searching for a match between portions of each received voice message for each user and the corresponding portions of each user's action records representing spoken phrases; and
   (2) if a match is found for one of the user's action records, performing an action, a priori associated with the action description, on the corresponding voice message.

5. A method for managing voice messages for use on a voice messaging system, which provides a voice messaging service to a number of users, the method comprising the steps of:
   enabling each user to edit their own action records in the voice messaging system, each action record comprising a name key field for representing name information of a calling party, a phone key field for representing information about a calling party number, a phrase key field for storing text representing a spoken phrase, and an action description, wherein contents of the name key field, phone key field, and phrase key field are created by each user and the action description is selected, from one of a number of selections provided by the voice messaging system, by each user such that each user can define their own association between the key fields and a selected action description independent of other user's defined action records;
   subsequently processing received voice messages for the users as a function of their respective action records by:
   (1) searching for matches between calling party name, calling party number, and spoken phrases of each received voice message for each user and the corresponding key fields of each user's action records; and
   (2) if a match is found for one of the user's action records, performing an action, a priori associated with the action description of the matched action record, on the corresponding voice message.

6. A method for managing voice messages for use on a voice messaging system, which provides a voice messaging service to a number of users, the method comprising the steps of:

enabling each user to edit their own action records in the voice messaging system, each action record comprising a name key field for representing name information of a calling party, a phone key field for representing information about a calling party number, a phrase key field for storing text representing a spoken phrase, and an action description, wherein contents of the name key field, phone key field, and phrase key field are created by each user and the action description is selected, from one of a number of selections provided by the voice messaging system, by each user such that each user can define their own association between the key fields and a selected action description independent of other user's defined action records;

subsequently processing each user's received voice messages as a function of their respective action records by:
(1) searching for a match between a calling party name of each received voice message, and contents of the name key field of each user's action records;
(2) if a match is found for one of the user's action records, checking a quality level of the match;
(3) if the checked quality level is above a predetermined threshold, performing an action, a priori associated with the action description of the matched action record, on the corresponding voice message;
(4) if the checked quality level is not above a predetermined threshold, comparing content of the phone key field of the matched action record with a calling party number of the corresponding received voice message; and
(5) if the content of the phone key field matches the calling party number, performing the action, a priori associated with the action description of the matched action record, on the corresponding voice message.

7. The method of claim 6 further comprising the steps of:
(6) if there is no match of the name key field, searching for a match between portions of the received voice message and content of the phrase key field; and
(7) if a match is found, performing the action, a priori associated with the action description of the matched action record, on the corresponding voice message.

* * * * *